United States Patent [19]

Mang

[11] Patent Number: 5,724,861
[45] Date of Patent: Mar. 10, 1998

[54] CAM FOLLOWER MOUNTING ASSEMBLY AND METHOD

[75] Inventor: Josef Mang, Lake Villa, Ill.

[73] Assignee: Emerson Electric Company, St. Louis, Mo.

[21] Appl. No.: 618,564

[22] Filed: Mar. 27, 1996

[51] Int. Cl.$^6$ .................................................. F16H 53/06
[52] U.S. Cl. .................................................. 74/569; 74/567
[58] Field of Search ................................ 74/465, 84 R, 74/813 L, 567, 569, 527

[56] References Cited

U.S. PATENT DOCUMENTS

| | | | |
|---|---|---|---|
| 3,611,846 | 10/1971 | Jeanneret | 74/822 X |
| 3,805,630 | 4/1974 | Cornair et al. | 74/89.21 |
| 4,049,017 | 9/1977 | McDonald et al. | 74/84 |
| 4,293,118 | 10/1981 | Olson et al. | 74/568 R |
| 4,379,415 | 4/1983 | Klancnik et al. | 74/813 L X |
| 4,877,346 | 10/1989 | Guenther et al. | 74/89.2 X |
| 4,932,274 | 6/1990 | Jones | 74/586 FS X |
| 5,040,426 | 8/1991 | Wueller | 74/569 X |
| 5,345,831 | 9/1994 | Sandrock | 74/53 |
| 5,603,245 | 2/1997 | Walczak et al. | 74/569 |

OTHER PUBLICATIONS

The McGill Co. commercial catalog front and back covers and pp. 11–54 for externally threading bearings used a cam followers.

Commercial Cam Co., illustration by their engineers for known design for mounting a roller cam follower.

Nov., 1994 commercial catalog for Commercial Cam Co., illustrating cam followers used in various commercial settings.

*Primary Examiner*—Vinh T. Luong
*Attorney, Agent, or Firm*—Tilton, Fallon, Lungmus & Chestnut

[57] ABSTRACT

A cam follower mounting assembly includes a mounting member, such as a rotary indexer output mounting plate, having first and second cam follower mounting surfaces and a bore between the mounting surfaces, and a cam follower mounted on the mounting member wherein the cam follower includes a mounting shaft received in the bore of the mounting member and having a cam follower member rotatably disposed on a first shaft end proximate the first cam follower mounting surface in a manner to be engaged by a cooperating cam track and a second shaft end proximate the second cam follower mounting surface. The second end of the mounting shaft includes a threaded bore extending from an second end surface substantially coaxial with the longitudinal axis of the mounting shaft. The mounting assembly further comprises a screw having an enlarged head and a threaded shaft threadably received in the threaded bore of the cam follower mounting shaft and a washer disposed between the enlarged head of screw and the second cam follower mounting surface. When the screw is threaded into the threaded bore of the cam follower mounting shaft to secure the cam follower on the mounting member, bending forces on the mounting shaft are substantially reduced to thereby improve perpendicular alignment of the mounting shaft with respect to the cam follower mounting surfaces and thus the cooperating cam track, thereby improving service lifespan of the cam follower and cam track.

4 Claims, 2 Drawing Sheets

CAM FOLLOWER MOUNTING ASSEMBLY AND METHOD

FIELD THE INVENTION

The present invention relates to mounting of cam followers relative to a mounting member, such as, for example, a rotary index drive output mounting plate, and, more particularly, to a cam follower mounting assembly and method that improves positioning accuracy of the cam follower relative to the mounting member.

BACKGROUND OF THE INVENTION

Cam operated rotary index drives are in widespread use with machine tools and other equipment to index a machine component, such as a machine tool dial plate or conveyor sprocket, in predetermined rotary increments. Typical rotary index drives include an indexer output mounting plate connected to the machine component to be indexed in rotary increments. The indexer output mounting plate includes a plurality of cam followers that are arranged in a circular array so as to cooperate with one or more cam tracks of an adjacent precision cam as the cam is rotated. The cam track(s) are configured to impart a predetermined rotary indexing motion to the indexer output mounting plate via the cam followers as the cam is rotated. Such index drives are described in U.S. Pat. Nos. 3,049,017 and 5,345,831.

Cam followers employed in the past in rotary index drives have included a cylindrical mounting shaft having a rotatable cam follower shell or member supported via anti-friction bearings on one end of the shaft for engaging the cam track and external threads at the other opposite end of the shaft by which the shaft is fixedly mounted on the indexer output mounting plate by a threaded lock nut. To secure the cam follower in position, the lock nut is threaded onto the external threads of the cam follower mounting shaft and screwed down until it meets the indexer output mounting plate surface to secure the cam follower in position.

Although the cam follower ideally is positioned with its mounting shaft axis perpendicular to the indexer output mounting plate, the above-described cam follower mounting technique has experienced problems in the past due to a lack of squareness of the face of the lock nut that engages the indexer output mounting plate. In particular, the lock nut face oftentimes is not square relative to the axis of the cam follower mounting shaft. As a result, when the lock nut is screwed down into the threaded mounting shaft of the cam follower and into engagement with the mounting plate, the lock nut's non-square face causes bending or bowing of the mounting shaft such that the shaft longitudinal axis is no longer perpendicular to the mounting plate as desired. This shaft bending or bowing results in a misaligned cam follower relative to the precision cam track. One contributing factor to this lack of squareness of the lock nut face has been the threaded pitch of the conventional cam follower mounting shaft.

Even if the lock nut face is ground square, such squaring is only effective at one point on the rotational axis of the thread. If the lock nut is turned, for example, 90°, the lock nut is no longer square due to lead angle error in the thread.

A technique adopted in the past in an attempt to reduce the problem of cam follower misalignment has involved precision grinding of the lock nut face that engages the mounting plate surface to improve its perpendicularity to the cam follower mounting shaft. However, this correction technique involves additional time consuming and costly machining operations of each of the lock nuts. In addition, the machining operation itself may not be accurate enough and/or consistent enough from one lock nut to the next to avoid the cam follower misalignment problem entirely.

An object of the present invention is to provide a method of mounting one or more cam followers on a mounting member, such as for example only, an indexer output mounting plate, that overcomes the problems and disadvantages described hereabove with respect to positioning of cam followers relative to the mounting member.

Another object of the present invention is to provide a cam follower mounting assembly that provides improved alignment of the cam follower relative to a mounting member and thus to a precision cam cooperating therewith.

SUMMARY OF THE INVENTION

The present invention provides a cam follower mounting assembly for a mounting member, such as a rotary indexer output mounting plate, having first and second cam follower mounting surfaces and a bore between the mounting surfaces. The mounting assembly includes a cam follower having a mounting shaft received in the bore of the mounting member. The mounting shaft includes a cam follower member rotatably disposed on a first shaft end proximate the first cam follower mounting surface and a second shaft end proximate the second cam follower mounting surface. The second shaft end includes an internal threaded bore extending from an axial shaft end surface in substantially coaxial relation with the longitudinal axis of the mounting shaft.

The cam follower mounting assembly further comprises a mounting screw having a threaded shaft threadably received in the threaded bore of the cam follower mounting shaft and a washer disposed between the screw and the second cam follower mounting surface.

When the mounting screw is threaded into the threaded bore of the cam follower mounting shaft to secure the cam follower on the mounting member pursuant to a method embodiment of the present invention, bending forces on the cam follower mounting shaft are substantially reduced by virtue of the coaxial relation of the threaded shaft bore and longitudinal shaft axis to thereby improve perpendicular alignment of the mounting shaft with respect to the cam follower mounting surfaces and thus the cooperating cam track. Due to the condition of the cam follower mounting shaft being internally threaded, there is a longer surface for axial engagement with the side-wall of the bore of the mounting member than externally threaded mounting shafts, which further contributes to improved alignment. Such improved alignment reduces wear of the cam follower and cam track and prolongs their service lifespans. Moreover, the improved alignment provides an overall more stable cam follower, due to its having an increased length-to-diameter ratio.

The present invention will be described in greater detail in the following detailed description thereof taken with the following drawings.

DETAILED DESCRIPTION OF THE INVENTION

Figure 1:
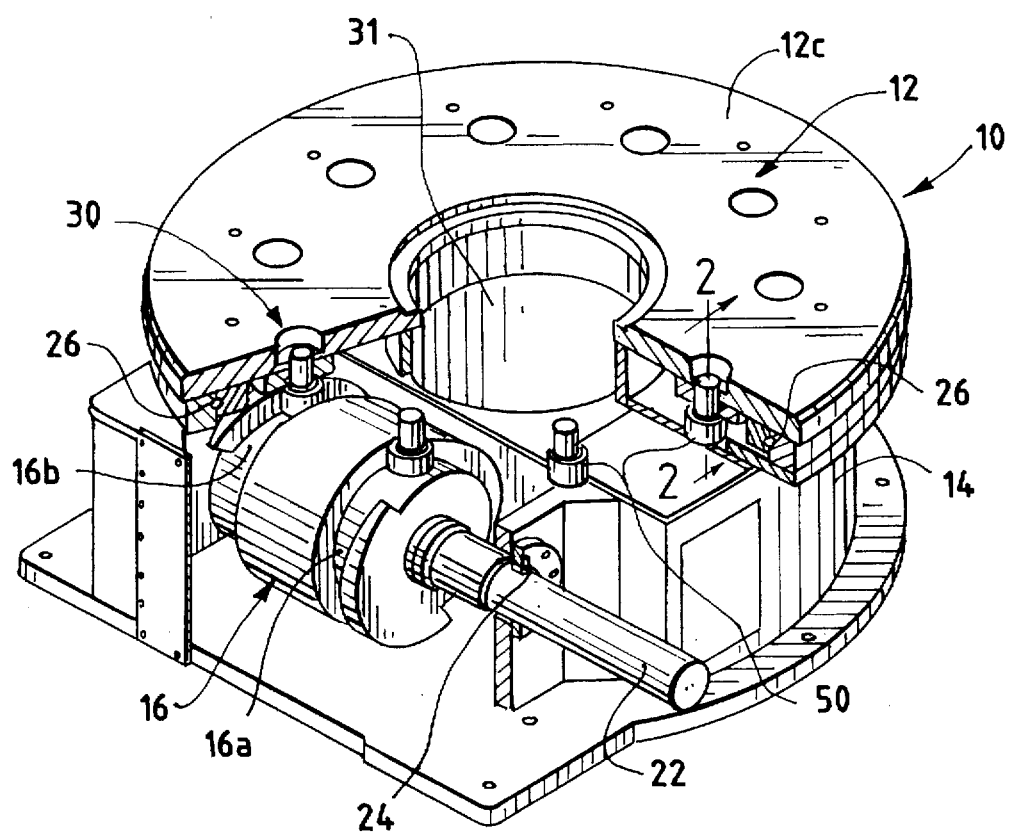
FIG. 1 is a perspective view, partially broken away, of a rotary index drive having a plurality of cam followers (sans mounting screws and washers) on an index drive output mounting plate for engagement by a precision cam.

Referring to FIG. 1, a rotary index drive 10 is shown for purposes of illustrating, but not limiting, the present invention. FIG. 1 illustrates cam follower mounting on the index drive output mounting plate or member 12 of the rotary index drive 10. The present invention is not limited to practice with respect to rotary index drives and instead can be practiced with respect to a wide variety of machines and equipment that employ one or more cam followers and one or more cams to control motion of a component of the machine or equipment.

The rotary index drive 10 includes a cast iron or steel housing 14 on which is mounted a precision cam 16 having a pair of circumferentially extending cam tracks 16a, 16b spaced laterally apart on the cam periphery. The cam tracks 16a, 16b have precision machined configuration chosen to control rotary motion of the output mounting plate or member 12 in a predetermined incremental manner or sequence as is known.

The precision cam 16 is mounted to an input drive shaft 22 mounted on the housing 12 by anti-friction bearings 24, such as tapered roller bearings. A shaft drive motor (not shown) is coupled to the input drive shaft 22 to rotate both the drive shaft 22 and the precision cam 16 mounted thereon.

The indexer output mounting plate or member 12 is mounted on the housing by suitable anti-friction bearings 26, such as the ball bearings and bearing raceways as shown in the broken away section of the plate or member 12. The output mounting plate or member 12 includes a first cam follower mounting surface 12a on a lower side thereof, FIG. 2. The first cam follower mounting surface 12a is formed on a plate extension 13 formed integrally with or attached to the main plate or member 12.

Figure 2:
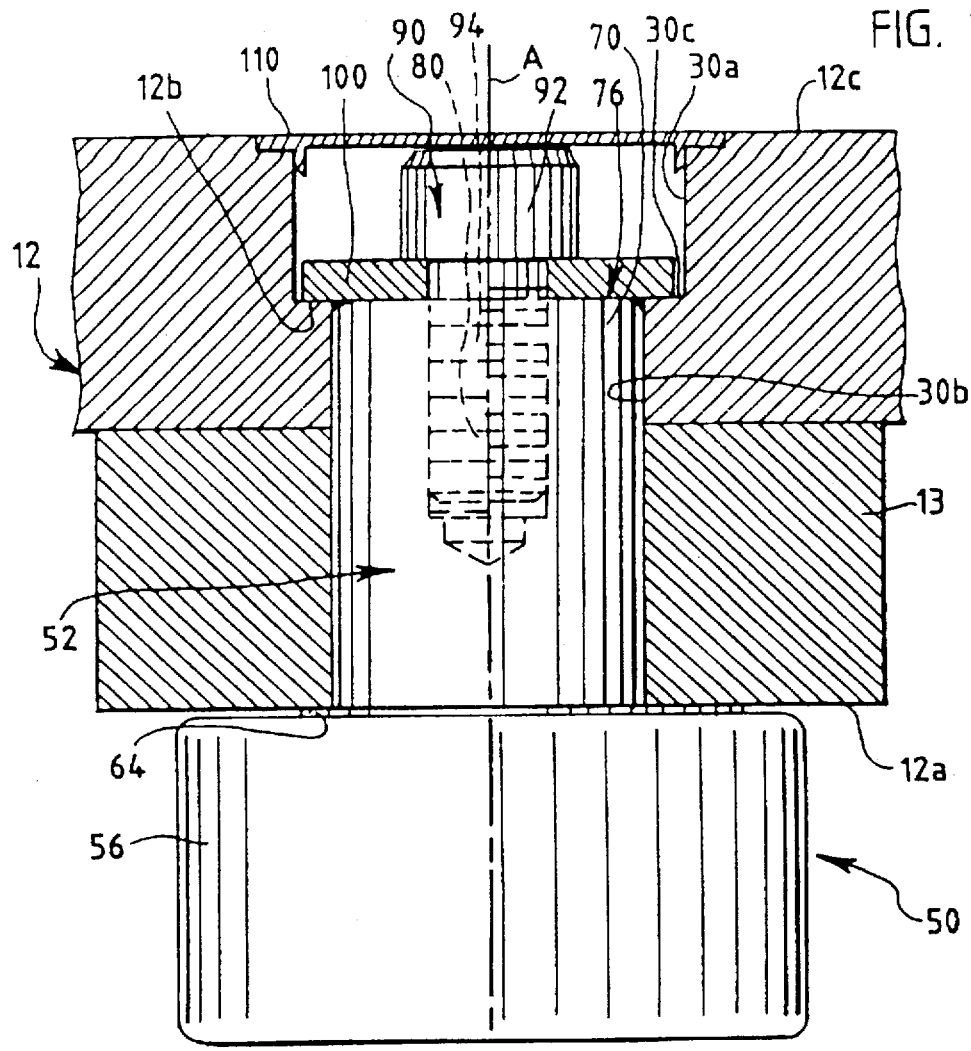
FIG. 2 is a cross-sectional view taken along lines 2—2 of FIG. 1 of the index drive output mounting plate with a cam follower mounted thereon in accordance with an embodiment of the present invention.

A plurality of second cam follower mounting surfaces 12b are formed by respective annular shoulders 30c of cylindrical counterbore sections 30a machined in the uppermost main mounting surface 12c of the plate or member 12, FIG. 2. The first and second cam follower mounting surfaces 12a, 12b are in parallel relation to one another. The first and second cam follower mounting surfaces 12a, 12b and bores 30 are precision machined in order to precisely position the cam followers 50 relative to the cam tracks 16a, 16b to achieve a precise predetermined rotary indexing of the mounting plate or member 12.

Each upper counterbore section 30a communicates with a cylindrical lower bore section 30b to form a through-bore 30 in the mounting plate or member 12. As shown best in FIG. 1, the through-bores 30 are disposed in a circular array on the mounting plate or member 12 about a vertical rotational axis of the plate or member 12. The main output mounting surface 12c of the plate or member 12 is connected to a component (not shown) of a machine tool or other equipment to be indexed in rotary increments. For example, the machine component may comprise a machine tool dial plate or conveyor sprocket to be rotated in increments relative to fixed tool stations. The plate or member 12 includes a central plate opening 31 that receives fluid lines, power lines, etc. for the machine being controlled.

Referring to FIG. 2, a cam follower 50 is shown mounted on plate or member 12 with the cam follower member 56 in a position to be engaged by the cam tracks 16a, 16b of the precision cam 16 (of FIG. 1).

Each of the cam followers 50 comprises a generally cylindrical mounting stud or shaft 52 received with close tolerance (e g. ∓0.0002 inch) in the cylindrical bore section 30b. The mounting stud or shaft 52 includes a first end 54 proximate the first cam follower mounting surface 12a. A cam follower shell or member 56 is rotatably supported on the first end 54 by anti-friction bearings 58, such as grease packed roller bearings, disposed between an outer, relatively large diameter annular flange 60 and by an inner, relatively small diameter annular flange 62, both integrally formed on the mounting shaft end 54. An annular end plate 64 is press fit on the shaft end 54 about the inner flange 62. The shaft end 54 can include a hexagonal or other socket 66 for receiving a wrench (not shown). In practicing the invention, the cam follower member, bearings, bearing flanges and end plate at the shaft end 54 can correspond in dimensions and tolerances to those present on CAMROL stud bearing CFH-289-4 available from McGill Manufacturing, Emerson Electric Corporation, Valparalso, Ind., as described in McGill Catalog No. 92.

Figure 3:
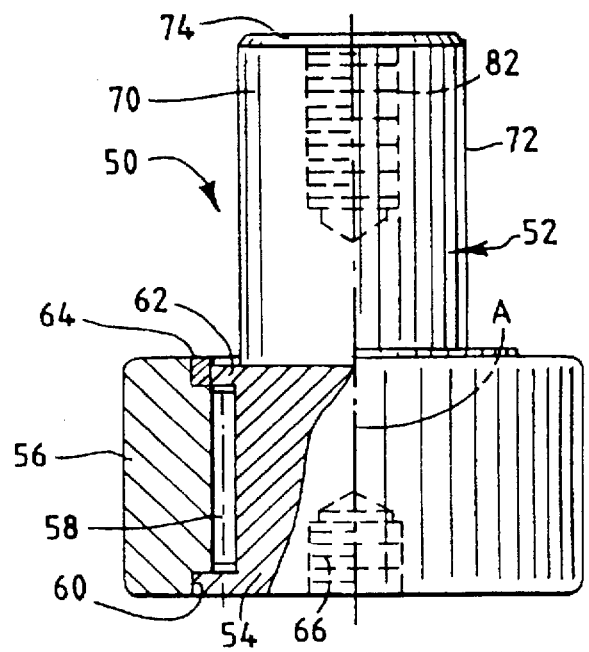
FIG. 3 is an elevational view, partially in section, of a cam follower in accordance with the invention.

In accordance with an embodiment of the invention, the mounting shaft 52 also includes a cylindrical second end 70 disposed proximate the second cam follower mounting surface 12b. The second shaft end 70 includes a cylindrical smooth, unthreaded outer surface 72 transitioning through a chamfered region 74 to a shaft axial end surface 76 that is generally coplanar with the annular shoulder 30c formed by the counterbore section 30a, FIG. 2. An internal longitudinal bore 80 extends from the axial end surface 76 substantially coaxial with the longitudinal axis A of the mounting shaft 52 as shown best in FIGS. 2–3. The bore 80 is internally tapped to form threads 82, which, for purposes of illustration only, can be 0.750-10UNC-3A threads that are 1.50 inches deep when the diameter of the shaft end 70 is 2.00 inches. (It will be understood that other size and type of fasteners, with different type threads, can be used for bore 80 and screw 90, as described below.)

The cam follower mounting shaft 52 typically comprises hardened steel where the first shaft end 54 is heat treated to a minimum hardness of 60 $R_c$ and the second shaft end 70 is heat treated to a hardness in the range of 36–44 $R_c$.

Each of the cam followers 50 is secured on the mounting plate or member 12 by a machine screw 90 having an enlarged end portion or screw head 92, a threaded shaft 94 threadably received in the threaded bore 80 and a flat one-piece or multi-piece washer 100 disposed between the enlarged screw head 92 and the second cam follower mounting surface 12b as shown best in FIG. 2. The washer 100 is disposed on the second cam follower mounting surface 12b (defined by shoulder 30c) and axial end surface 76 of the mounting shaft 52. The machine screw 90 typically comprises a conventional hardened ($R_c$ 38–45) steel machine screw, designated as a socket head cap screw, although the invention is not limited to any particular screw or size thereof. The retainer washer 100 typically comprises a conventional steel washer having an inner diameter of 0.812 inch and outer diameter of 2.442 inches, although the invention is not limited to any particular washer or size thereof. The mounting screw 90 and mounting washer 100 described herebelow and shown in FIG. 2 are not shown in FIG. 1 for clarity in illustrating components of the rotary index drive.

In mounting each of the cam followers 50 on the mounting plate or member 12 in accordance with a method embodiment of the invention, screw 90 and washer 100 for each cam follower are positioned in each counterbore section 30a and aligned with the threaded bore 80 of the cam follower shaft 52 in the bore section 30b. The screw 90 then is threaded into the threaded bore 80 with the washer 100 disposed beneath the screw head 92 about the threaded screw shaft 94 to secure the cam follower 50 in the bore section 30b of the mounting member 12. The screw 90 is threaded to a preferred torque of approximately 420 ft. lbs., so that the cam follower 50 is properly secured on the mounting plate or member 12. During threading of the screw 90 into the threaded bore 80, bending forces on the cam follower mounting shaft 52 are substantially reduced or minimized by virtue of the substantially coaxial relationship between the threaded bore 80 and longitudinal axis of the mounting shaft 52. In this way, the cam follower 50 is positioned on the mounting plate or member 12 with little, if any, bending or bowing of its mounting shaft 52 so that the substantially perpendicular alignment of the axis A of the mounting shaft 52 with respect to the cam follower mounting surfaces 12a, 12b is achieved. Improved perpendicularity of the mounting shaft 52 to the mounting surfaces 12a, 12b translates to improved alignment of the cam follower 50 relative to the cam tracks 16a, 16b of the precision cam 16. Such improved alignment reduces wear of the cam follower and cam track and prolongs their service lifespans. Moreover, the improved alignment provides an overall more stable cam follower (e.g. one having an increased length-to-diameter ratio of 1.5:1 or better).

After the cam followers 50 are mounted on the mounting member 12, a plastic protective cap 110 can be disposed by snap fitting in a manner to cover each bore 30 to prevent entry of foreign matter therein.

Although the invention has been described with respect to certain embodiments thereof, those skilled in the art will understand that it is not intended to be limited thereto and that changes and modifications can be made therein within the scope of the appended claims.

I claim:
1. A cam follower mounting assembly in combination with a mounting member having first and second cam follower mounting surfaces and a bore between said mounting surfaces, comprising:
   a cam follower having a mounting shaft received in said bore and defining a longitudinal shaft axis, said mounting shaft having a cam follower member rotatably disposed on a first shaft end proximate said first cam follower mounting surface and a second shaft end proximate said second cam follower mounting surface, said second end having a threaded internal bore extending from an axial shaft end surface coaxial with said longitudinal axis,
   a screw having a threaded shaft threadably received in said threaded internal bore,
   a washer disposed between said screw and said second cam follower mounting surface, and
   said threaded shaft of said screw being threaded into said threaded internal bore of said mounting shaft substantially coaxially with said longitudinal axis to secure said cam follower on said mounting member with reduced bending forces on said mounting shaft to improve alignment of said mounting shaft with respect to said mounting member.

2. The assembly of claim 1 wherein said second cam follower mounting surface is defined by an annular shoulder formed by a counterbore in said mounting member.

3. The assembly of claim 1 wherein said axial shaft end surface is coplanar with said second cam follower mounting surface and said washer is disposed on said second cam follower mounting surface and said axial shaft end surface about said threaded shaft of said screw.

4. The assembly of claim 1 wherein said mounting member comprises an output mounting plate of a rotary index drive.

* * * * *

Disclaimer 5,724,861 - Josef Mang, Lake Villa, Ill. CAM FOLLOWER MOUNTING ASSEMBLY AND METHOD. Patent dated March 10, 1998. Disclaimer filed October 21, 1998, by the assignee, Emerson Electric Company.

Hereby enters this disclaimer to claims 1, 2, 3 and 4 of said patent.
*(Official Gazette, June 22, 1999)*